Patented Jan. 9, 1940

2,186,730

UNITED STATES PATENT OFFICE 2,186,730

MULTICOLOR PHOTOGRAPHY

Wilhelm Schneider, Dessau, Germany, assignor, by mesne assignments, to Agfa Ansco Corporation, Binghamton, N. Y., a corporation of Delaware No Drawing. Application May 6, 1937, Serial No. 141,093. In Germany May 8, 1936

5 Claims. (Cl. 95—2)

The present invention relates to multicolor photography and more particularly to a process of producing three-color photographs by color development with the use of three emulsions sensitive to different regions of the spectrum, each emulsion containing a color development component and being converted into small slightly hardened particles mixed together and applied in the form of a layer.

It is an object of the present invention to render practicable this process which has been already suggested by "Photographische Rundschau", 1911, page 2, and U. S. Patent 1,055,155 of Mar. 4, 1913. Further objects will be seen from the detailed specification following hereafter.

The process as described in "Photographische Rundschau" has been developed from the theoretical standpoint. What is lacking for practical purposes are components which can be fixed within the particles which are to carry them. The several components named in U. S. Patent 1,102,028 of June 30, 1914 are not suitable for this purpose, since they are capable of diffusion and do not persist as separate colors.

The present invention renders the processing question practicable by using instead of the color components hitherto suggested components which are not capable of diffusing from one particle to another. Applicant has found useful, for example, those color components named in U. S. Patents 2,179,238, 2,178,612 and U. S. patent application Ser. No. 94,340 filed Aug. 5, 1936.

In these applications there are described various suitable color development components which are fast to diffusion with respect to the binding agent of the silver halide emulsion. Suitable color components of this kind are, for instance, para-(hydroxynaphthoylamino)-1-phenyl-3-methyl-5-pyrazolone; terephthaloyl-bisacetic acid-aniline; 3.5-diphenylamino-phenol; 1-(para-stearyl-amino-phenyl) - 3 - methyl-5-pyrazolone; dibenzoyl acetic acid benzidide; di-(α-hydroxynaphthoyl) benzidide and the condensation product from 1.5-aminonaphthol and the mixed polymerization product from vinyl chloride and maleic acid anhydride.

The following example serves to illustrate the invention without limiting it to the specific details mentioned therein.

1 kilo of a silver halide emulsion is mixed with 10 grams of dibenzoyl acetic acid benzidide dissolved in 30 cc. of methanol and 10 cc. of caustic soda lye of 20 per cent strength.

1 kilo of a green sensitized emulsion is mixed with 10 grams of para-stearoylamino-phenyl-methylpyrazolone and dissolved in methanol and caustic soda lye and a sufficient quantity of a yellow filter dye which is incapable of diffusing is added.

1 kilo of a red sensitized emulsion is mixed with 10 grams of di-(α-hydroxynaphthoyl) benzidide dissolved in methanol and caustic soda lye and a yellow filter dye is added.

The three emulsions are separately brought into the form of small particles which are then mixed together. The mixture obtained is applied with the addition of any suitable binding agent to a suitable support.

This film after exposure is first developed in an ordinary developer, then thoroughly exposed to light and developed in a developer consisting of 2 grams of para-diethylaminoaniline, 6 grams of calcined sodium carbonate and 200 grams of water. Washing and reduction in Farmer's reducer follow and there is produced a pure positive color picture.

The silver of the first produced black and white negative may alternatively be separated from the remaining and illuminated silver halide before the second (color) development. Also there may be produced with the said color developer in a single development a complementary color negative which together with the silver image or after the removal thereof may be copied on a similar or any other color material and worked up to the correct color positive.

What I claim is:

1. A process of producing a multicolor photographic material, which comprises preparing a silver halide emulsion containing dibenzoyl-acetic-acid-benzidide, a second green-sensitized silver-halide emulsion containing para-stearoyl-amino-phenyl-methylpyrazolone and a yellow filter dye, and a third red-sensitized silver-halide emulsion containing di-(α-hydroxynaphthoyl)-benzidide and a yellow filter dye, separately converting the emulsions into microscopic, slightly hardened particles, mixing the emulsions thus treated and applying the mixture to a photographic support in the form of a unitary layer.

2. As an article of manufacture a silver halide emulsion suitable for color photography, said emulsion containing three types of differently colored microscopic slightly hardened particles, each of said types of particles having incorporated another of the dyestuffs selected from the group of dibenzoyl-acetic-acid-benzidide, parastearoylamino-phenyl-methylpyrazolone and di-(α-hydroxynaphthoyl)-benzidide.

3. A process of producing multicolor photographic material, which comprises preparing three different silver halide emulsions each emulsion having admixed thereto a different dyestuff component, at least one of said dyestuff components having linked to an atom of its molecule by an acid amide linkage a long chain aliphatic alkyl radical of from 11 to 18 C-atoms, said dyestuff component being fast to diffusion with respect to the binding agents of said silver halide emulsions and capable of forming a dye in one of the fundamental colors of the spectrum, separately converting the said emulsions into microscopic, slightly hardened particles, mixing the emulsions thus treated and applying the mixture to a photographic support in the form of a unitary layer.

4. A silver halide emulsion for color photography containing three types of differently colored microscopic slightly hardened particles, each type of particles having incorporated a photographic dyestuff component different from that of the other types, at least one of said dyestuff components having linked to an atom of its molecule by an acid amide linkage a long chain aliphatic alkyl radical of from 11 to 18 C-atoms, said dyestuff component being fast to diffusion with respect to the binding agent of the silver halide emulsion and capable of forming a dye in one of the fundamental colors of the spectrum.

5. A process of producing multicolor photographic material, which comprises preparing three different silver halide emulsions each emulsion having admixed thereto a different dyestuff component, at least one of said dyestuff components having linked to an atom of its molecule by a homopolar linkage an aliphatic carbon chain of at least 5 carbon atoms, said dyestuff component being fast to diffusion with respect to the binding agents of said silver halide emulsions and capable of forming a dye in one of the fundamental colors of the spectrum, separately converting the said emulsions into microscopic, slightly hardened particles, mixing the emulsions thus treated and applying the mixture to a photographic support in the form of a unitary layer.

WILHELM SCHNEIDER.